(12) United States Patent
Shah et al.

(10) Patent No.: US 8,016,549 B2
(45) Date of Patent: Sep. 13, 2011

(54) TURBINE ENGINE ALLOYS AND CRYSTALLINE ORIENTATIONS

(75) Inventors: Dilip M. Shah, Glastonbury, CT (US); Joseph G. Hillebrand, Bolton, CT (US); Daniel E. Kane, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 1312 days.

(21) Appl. No.: 11/486,743

(22) Filed: Jul. 13, 2006

(65) Prior Publication Data
US 2011/0081235 A1  Apr. 7, 2011

(51) Int. Cl.
*F01D 25/26* (2006.01)
(52) U.S. Cl. ......................... 415/134; 277/650; 277/651
(58) Field of Classification Search .................. 277/650, 277/651; 415/134
See application file for complete search history.

(56) References Cited

U.S. PATENT DOCUMENTS

| | | | |
|---|---|---|---|
| 4,555,980 A * | 12/1985 | Hoglund | 92/88 |
| 4,605,452 A | 8/1986 | Gemma et al. | |
| 4,668,557 A | 5/1987 | Lakes | |
| 5,158,430 A * | 10/1992 | Dixon et al. | 415/134 |
| 6,447,871 B1 | 9/2002 | Hawkins | |
| 2004/0051254 A1 | 3/2004 | Smed | |
| 2005/0224144 A1 | 10/2005 | Pollock et al. | |
| 2006/0082074 A1 | 4/2006 | Synnott et al. | |

FOREIGN PATENT DOCUMENTS

| | | |
|---|---|---|
| EP | 0767329 A1 | 4/1997 |
| GB | 2235200 A | 2/1991 |
| GB | 2396193 A | 6/2004 |
| WO | 00/12870 A1 | 3/2000 |
| WO | 2005/089190 A2 | 9/2005 |

OTHER PUBLICATIONS

K. E. Evans and K. L. Alderson, Engineering Science and Education Journal, Aug. 2000,vol. 9, Issue 4, pp. 148-154.*
Friis, E. A., Lakes, R. S., and Park, J. B., "Negative Poisson's Ratio Polymeric and Metallic Foams", 2001 http://silver.neep.wisc.edu/~lakes/PoissonPolyMet.pdf.
European Search Report for EP07252722.9, dated Jun. 2, 2009.
J.B. Choi et al., Design of a Fastener Based on Negative Poisson's Ratio Foam, Cellular Polymers, Jan. 1, 1991, pp. 205-212, vol. 10, No. 3.
Ray H. Baughman et al., Negative Poisson's Ratios as a Common Feature of Cubic Metals, Nature Macmillan Magazines, Mar. 26, 1998, pp. 362-365, vol. 392, No. 6674.
P.J. Stott et al., A Growth Industry, Proceedings of the 6th International Wool Textile Research Conference, the Institute of Materials, Oct. 1, 2000, pp. 12-14, vol. 8.
Love, A Treatise on the Mathematical Theory of Elasticity, University Press, 1906, pp. 160-161.
E.N. Kablov et al., Intermetallic Ni3Al-Base Alloy: A Promising Material for Turbine Blades, Metal Science and Heat Treatment, Jul. 2002, pp. 284-287, vol. 44, No. 7-8.

* cited by examiner

*Primary Examiner* — Edward Look
*Assistant Examiner* — Dwayne J White
(74) *Attorney, Agent, or Firm* — Bachman & LaPointe, P.C.

(57) ABSTRACT

A method is provided for engineering a single crystal cast gas turbine engine first component for cooperating with a second component. An at least local first operational stress on the first component is determined. The first operational stress has a first direction. A crystal orientation within the component or a physical configuration of the component is selected so that the first operational stress produces a desired engagement of the first component with the second component associated with either a negative Poisson's effect or high Poisson's effect in a second direction. Single crystal or highly textured iron- and nickel-base alloys enable one to use such effect in high temperature and/or corrosive environments.

15 Claims, 11 Drawing Sheets

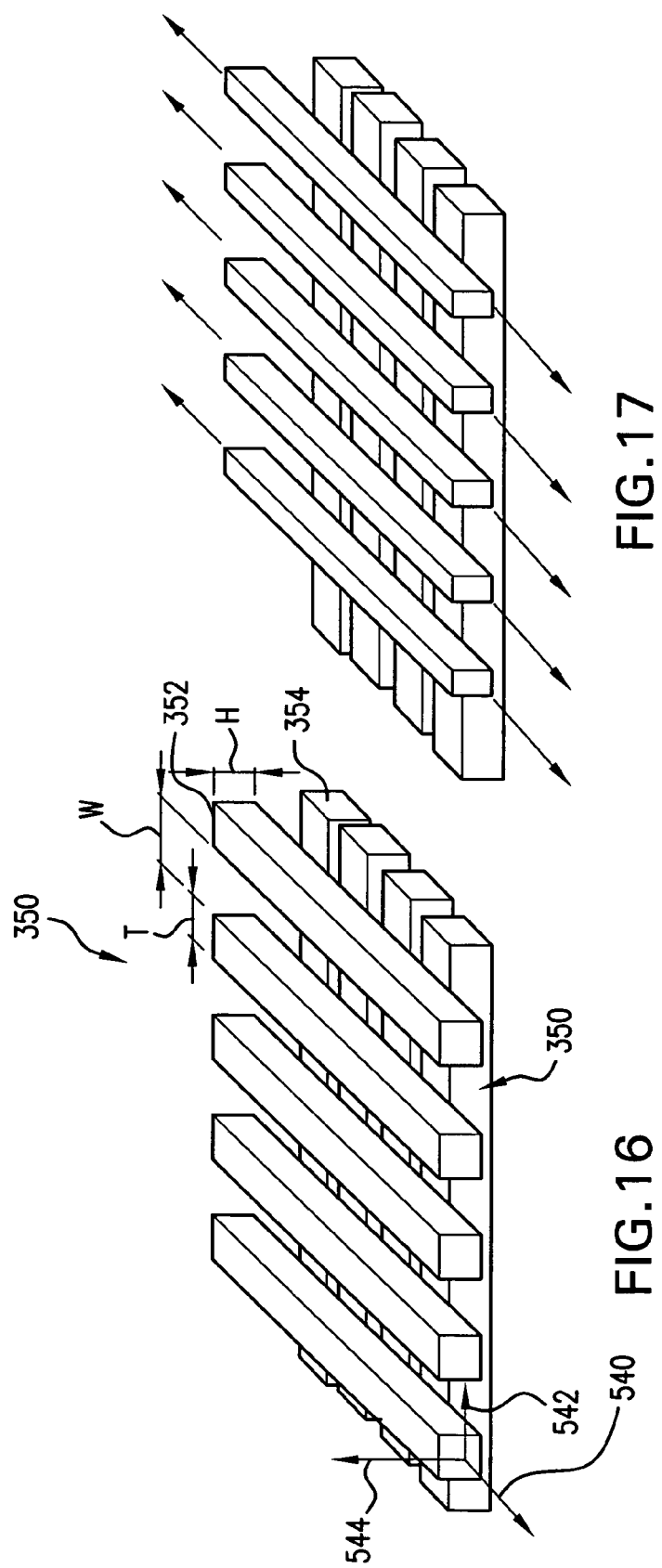

TURBINE ENGINE ALLOYS AND CRYSTALLINE ORIENTATIONS

BACKGROUND OF THE INVENTION

The invention relates to gas turbine engines. More particularly, the invention relates to alloy selection and crystalline orientation for gas turbine engine components.

Gas turbine engine components are commonly formed of alloys, typically nickel- or cobalt-based superalloys. Many components, such as blades are formed of single crystal (SX) alloys. In such single crystal components, essentially the entire component is formed of a single continuous crystal lattice. Typically, the orientation of that lattice is predetermined to achieve desired properties of the component. The orientation may be assured by use of a grain starter or other casting techniques.

By way of example, U.S. Pat. No. 4,605,452 of Gemma and Dierberger identifies face centered cubic (FCC) single crystal gas turbine blades wherein the [110] crystal axis is tangent to the blade airfoil surface in a critical crack-prone region just behind the leading edge of the airfoil at about 40-80% of the airfoil span.

Generally most materials subjected to elastic tensile stress shrink transversely to the direction in which the tension is applied. Similarly, they will transversely expand if compressed. This is called Poisson's effect and it is characterized as a negative ratio of the transverse strain to the longitudinal strain. Typically the value of Poisson's ratio is around +0.33 for most isotropic (i.e., properties identical in all directions) engineering structural materials. FIG. 1 shows a tensile stress σ (sigma) applied to a piece 20 of such material. The material is strained to a condition 20' wherein it has expanded along the direction of the stress and contracted transverse thereto.

Several naturally occurring materials such as cork and some artificially made foams are known to display negative Poisson's ratio. Such materials transversely expand when pulled and shrink when compressed. Such materials are often referred to as auxetics. Auxetic materials such as cork make good sealing material and find many unusual applications. For example, cork makes a good seal plug for wine bottles. When pushed at an end, the cork does not substantially expand diametrically. This facilitates ease of insertion through the bottle mouth and provision of a good seal. FIG. 2 shows a tensile stress a (sigma) applied to a piece 22 of such material. The material is strained to a condition 22' wherein it has expanded along the direction of the stress and also expanded in at least one direction transverse thereto.

SUMMARY OF THE INVENTION

One aspect of the invention involves a method for engineering a single crystal cast gas turbine engine first component for cooperating with a second component. An at least local first operational stress on the first component is determined. The first operational stress has a first direction. A crystal orientation within the component or a physical configuration of the component is selected so that the first operational stress produces a desired engagement of the first component with the second component associated with a negative Poisson's effect in a second direction.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 16 is a view of a filter.

FIG. 17 is a view of the filter of FIG. 16 with a tensile force applied.

Like reference numbers and designations in the various drawings indicate like elements.

DETAILED DESCRIPTION

Figure 1:
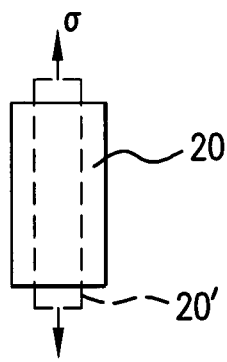
FIG. 1 is a schematic view of a tensile stress applied to a normal material.
Figure 2:
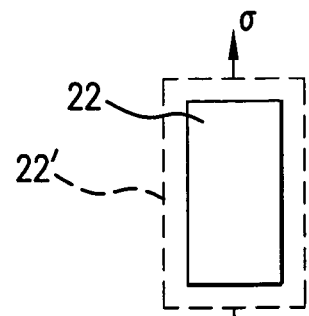
FIG. 2 is a schematic view of a tensile stress applied to an auxetic material.
Figure 3:
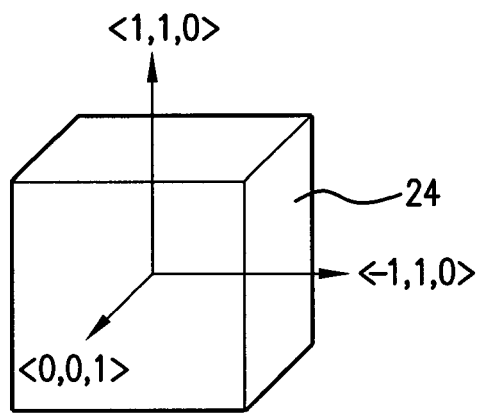
FIG. 3 is a diagram of crystallographic axes of a face centered cubic crystal in a relaxed state.
Figure 4:
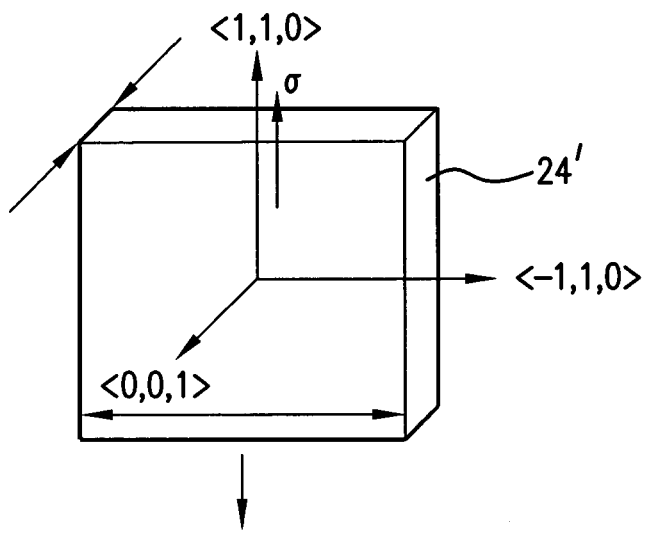
FIG. 4 is a diagram of the crystal of FIG. 3 with a tension applied in the <1,1,0> direction.

While the development of auxetic foams and elastomeric fibers is a very active area of research, little attention is paid to the fact that many nickel- and iron-base single crystals display a combination of a negative Poisson's effect and a very high positive Poisson's effect in specific pairs of orthogonal orientations (a direction of applied stress and an orthogonal direction in which the effect is observed). An exemplary nickel-base blade alloy exhibiting auxetic properties has a nominal composition in weight percent of about 12Ta, 10.4Cr, 5.3Co, 4.8Al, 4.1W, 1.3Ti, balance Ni plus impurities. FIG. 3 shows axes <1,1,0>, <0,0,1>, and <−1,1,0> for piece 24 of a such material. FIG. 4 shows a tensile stress (sigma) applied along the <1,1,0> direction. The material is strained to a condition 24' wherein it has expanded along the direction of the stress. The material has also expanded along the transverse <−1,1,0> direction, but contracted along the transverse <0,0,1> direction. For the exemplary material, the Poisson's ratio for the <−1,1,0> direction relative to tensile stress in the <1,1,0> direction is −0.12. The Poisson's ratio for the <0,0,1> direction relative to tensile stress in the <1,1,0> direction is 0.72.

As shown schematically in FIG. 4, the material shrinks or contracts as much as 72% in the <0,0,1> direction while it stretches under tension in the <1,1,0> direction. Surprisingly, it also expands 12% in the <−1,1,0> direction (approximately the same percentage as it stretches in the direction of the applied stress). This expansion is 19% in $Ni_3Al$ providing a Poisson's ratio of −0.19. The effect in most auxetic alloys is enhanced at higher temperatures.

Available data also shows that the same effect occurs in pure nickel, pure iron, intermetallic $Ni_3Al$ and NiAl, the nickel-based superalloy having a nominal composition of about 10.0Co, 5.0Cr, 2.0Mo, 6.0W, 3.0Re, 8.7Ta, 5.6Al, 0.1Hf, balance Ni plus impurities, and the nickel-based superalloy having a nominal composition of about 10.0Co, 9.0Cr, 2.0Mo, 12.0W, 1.0Nb, 5.0Al, 2.0Ti, 2.0Hf, 0.11C, 0.1Zr, 0.015B, balance Ni plus impurities), and is therefore likely to occur in many Ni and —Fe based alloys, irrespective of the actual chemistry. Based on the limited data, it appears that the effect is most pronounced in $Ni_3Al$, which is also present as 60-70% by volume in complex nickel base superalloys (e.g., having about 4-6% Al by weight) such as the three nickel-based superalloys noted above, and in CMSX-4 and Rene-N5. Based on this, it is theorized that the effect may be maximized upon alloying with elements such as Ti, Ta, Nb, Sn, Ge, Si, and others, which primarily substitute for Al in $Ni_3Al$.

To maximize the usefulness of the Poisson's effect, the single crystal primary and secondary orientations should be precisely aligned relative to the applied stress. The negative Poisson's effect does not occur for example if the stress were applied along <1,0,0> or <1,1,1> directions. It is understood that the existence of both positive and negative (auxetic) Poisson's effect in the same material opens up the possibility of achieving, on an average, a desired Poisson's effect using highly textured multigrain material. It is fortuitous that certain high temperature alloys already used in the aerospace field exhibit auxetic properties. Many such materials are suitable for new uses in aircraft gas turbine engines and industrial gas turbines at temperatures up to 2300° F.

Auxetic properties may have several roles in turbine engines. One aspect involves selection of the material and its crystalline orientation to achieve a desired operational cooperation with an additional engine component or components. Another potentially overlapping aspect involves selection of a material and its crystalline orientation to facilitate particular assembly techniques. Another potentially overlapping aspect involves selection of the material and its orientation to provide various dynamic properties.

Some or all of these aspects may be found in various sealing applications.

Figure 5:
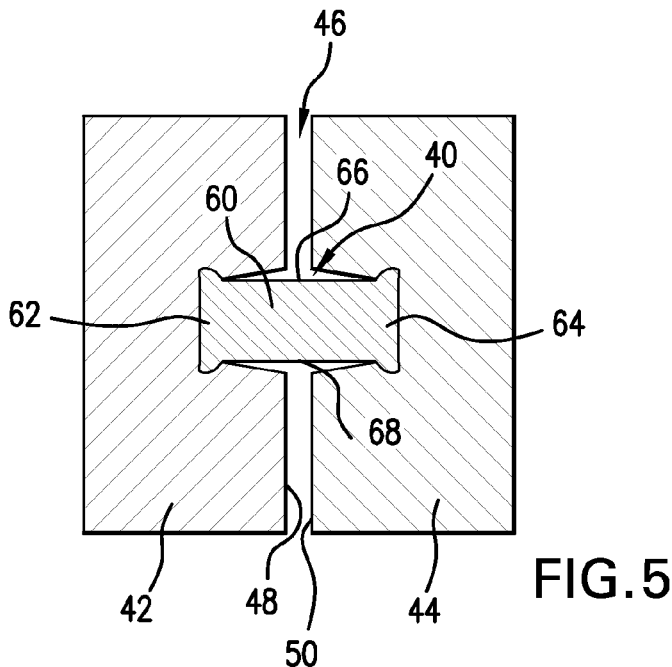
FIG. 5 is a view of a first seal sealing between two members.
Figure 6:
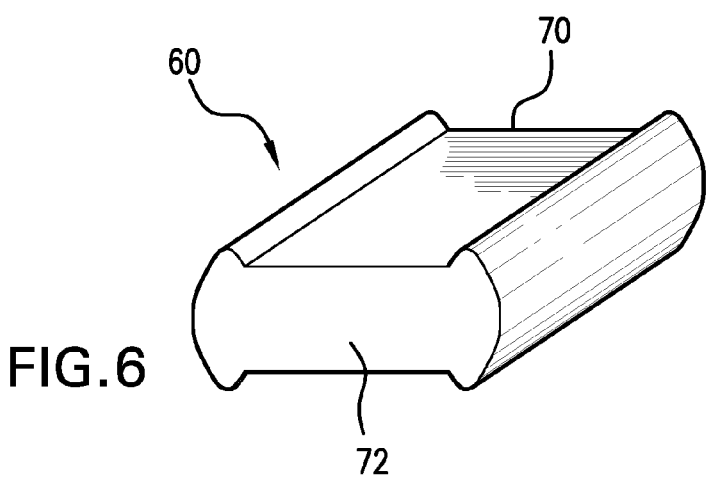
FIG. 6 is an isolated view of the seal of FIG. 5.

FIG. 5 shows a seal 40 sealing between first and second members 42 and 44. The seal 40 spans a gap 46 between adjacent surfaces (faces) 48 and 50 of the first and second members, respectively. The seal 40 has a generally flat body 60 extending between first and second edge protuberances or lips 62 and 64, respectively. The seal has first and second opposed faces 66 and 68 along the body and first and second ends 70 and 72 (FIG. 6). The seal protuberances 62 and 64 and adjacent portions of the body 60 are captured within slots 74 and 76 (FIG. 7) of the members 42 and 44.

Each of the slots 74 and 76 has an outboard portion between a pair of opposed surfaces 80 and 82 which converge inward toward each other from the associated surface 48 or 50 to form a convergence, throat, or neck 83 (for which the surfaces 80. At inboard ends, the slot opens up with divergent surfaces 84 and 86 (which form shoulders of the neck/throat). The exemplary slots have base surfaces 88. In the illustrated example, the slots have opening heights $H_1$ and throat 83 heights $H_2$. The exemplary protuberances 62 and 64 are shown having a thickness or height $H_3$. The exemplary body 60 is shown having a height $H_4$. Exemplary $H_3$ is slightly less than $H_1$ and greater than $H_2$. Exemplary relaxed $H_4$ may or may not be greater than the height of the component cavities at the end (e.g., it may be slightly smaller than $H_2$ in many cases).

Figure 7:
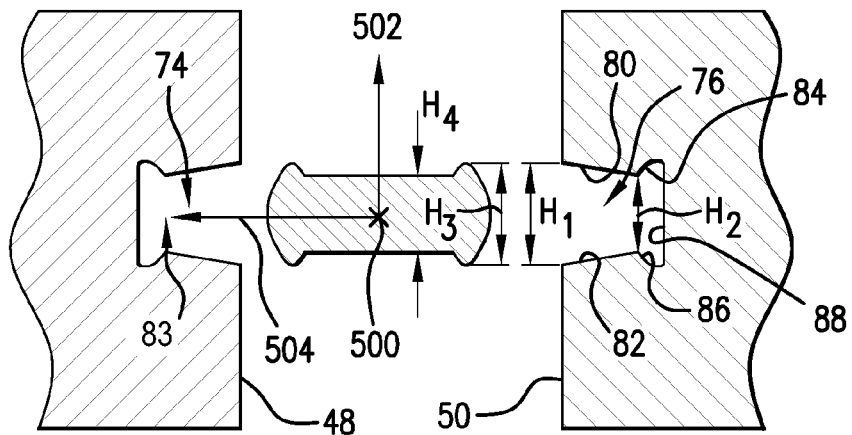
FIG. 7 is a view of the seal of FIG. 5 during installation.

FIG. 7 further shows coordinate axes 500, 502, and 504. In an exemplary implementation, these are coincident with the <0,0,1>, <−1,1,0>, and <1,1,0> crystallographic axes, respectively. Axis 500 falls parallel to the length of the seal between the ends 70 and 72 (e.g., out of the page as used in FIG. 7). The axis 502 extends normal to the body 60 and its faces 66 and 68. The axis 504 extends toward one of the members 42 and 44. In an exemplary assembly, the members 42 and 44 are brought toward each other with the seal 40 therebetween. The seal protuberances encounter the slot outboard portion and contact the associated slot surfaces 80 and 82. Further relative compression of the members 42 and 44 applies a compressive stress to the seal in the <1,1,0> direction. With the exemplary auxetic properties, this compression produces contraction in the <−1,1,0> direction while causing expansion in the <0,0,1> direction. The contraction facilitates further relative compression of the members until the protuberances toggle over the throats and into the enlarged terminal portions of the slot. Depending on the design of the seal and the two component cavities, as well as the relative position of the members 42 and 44, the exemplary protuberances 62 and 64 may or may not be under compression. For example if the members 42 and 44 are pulled away from each other after the assembly, thereby relieving compression stress on the seal 40, the exemplary protuberances 62 and 64 will tend to protrude to their natural position, filling the cavity.

Exemplary members 42 and 44 may be a pair of adjacent blade or vane platforms, shrouds, or air seal segments sealed edge-to-edge by the seal 40.

Figure 8:
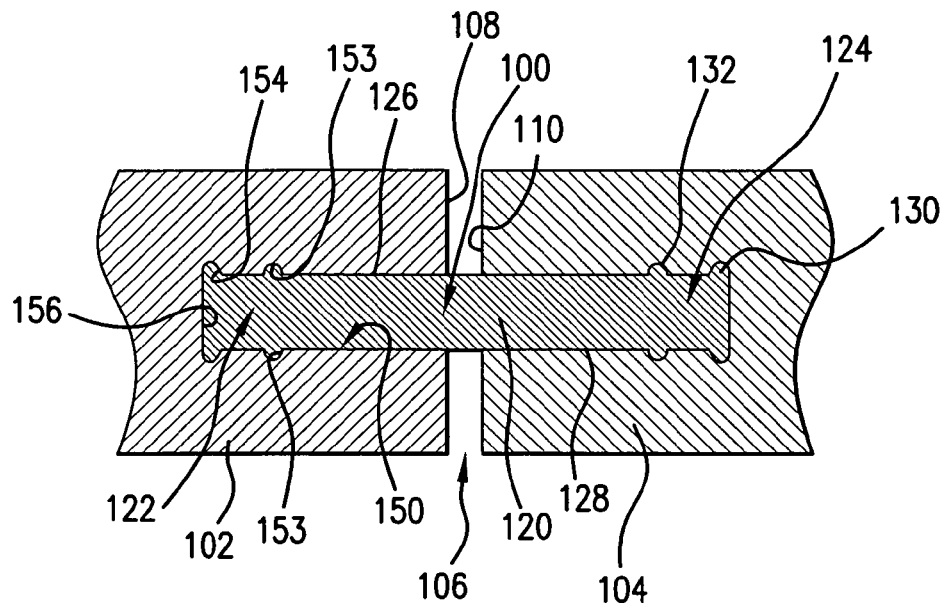
FIG. 8 is a view of a second seal sealing between two members.

Alternatively, a high positive Poisson's ratio may be used to facilitate seal installation. FIG. 8 shows a seal 100 sealing between first and second members 102 and 104. The seal 100 spans a gap 106 between adjacent surfaces (faces) 108 and 110 of the first and second members, respectively. The seal 100 has a generally flat body 120 extending between first and second end portions 122 and 124. The body has first and second faces 126 and 128. Each end portion has a pair of terminal and intermediate protrusions or lips 130 and 132, respectively, with each pair forming an associated protuberance. In alternative configurations, the protuberance may be formed by a protrusion extending from but a single face of the body.

Figure 9:
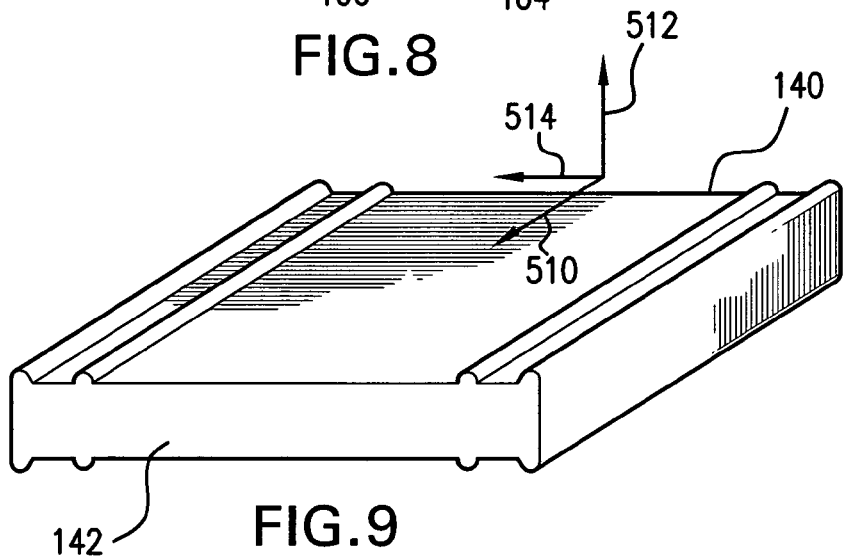
FIG. 9 is an isolated view of the seal of FIG. 8.

The seal 100 extends between first and second ends 140 and 142 (FIG. 9). An alternative configuration of the seal may be in the form of an uninterrupted ring. The end portions 122 and 124 and adjacent portions of the seal body 120 are captured within slots 150 and 152 (FIG. 10) in the members 102 and 104. The exemplary slots include recesses for retaining the seal. The exemplary recesses include pairs of inboard and outboard recesses 153 and 154, respectively. The exemplary outboard recesses 154 are near bases 156 of the associated slots. The exemplary recesses 153 and 154, respectively, capture the associated protrusions 130 and 132.

Figure 10:
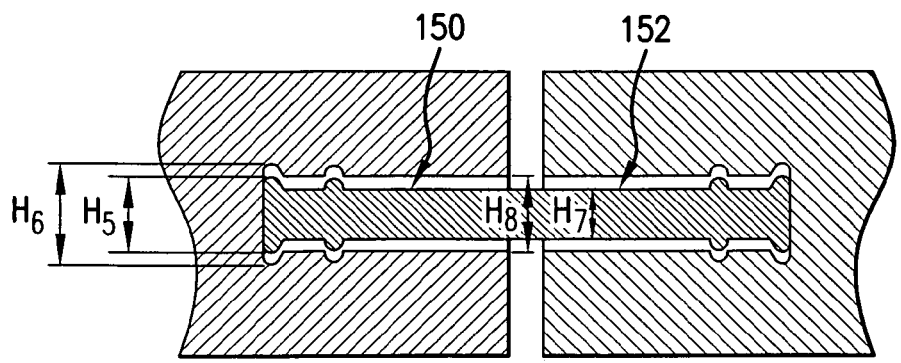
FIG. 10 is a view of the seal of FIG. 8 during installation.

Particularly in embodiments where the slots 150 and 152 are closed-ended, insertion of the seal may be facilitated by making use of the positive Poisson's ratio. In particular, FIG. 9 shows a first axis 510 along a length of the seal, a second axis 512 normal thereto and normal to the surfaces 126 and 128, and a third axis 514 normal to the first two axes. In an exemplary implementation, the first axis 510 may be a <1,1,0> axis. The second axis 512 may be a <0,0,1> axis, making the third axis 514 a <1,−1,1,> axis. Applied tension in a first direction along the first axis 510 will produce a substantial contraction in a second direction along the axis 512. FIG. 10 shows the seal as having a thickness or height $H_5$ along the protuberances. The slot has a height $H_6$ at the recesses. The seal has a thickness or height $H_7$ along the body. The slot has a height $H_8$ away from the recesses. A relaxed $H_5$ would advantageously be greater than $H_8$ for retention. However, under the applied tension, $H_5$ may become less than $H_8$ thereby facilitating insertion.

The tension may be applied via a fixture (not shown—e.g., one grasping the seal adjacent both ends). Additionally, the seal may be provided with special features for engaging the fixture. Additionally, near the ends 140, 142, the protrusions may be formed so as to taper in the relaxed state. This taper may compensate for the reduced local tension in the tensioned state and, thereby, for reduced contraction. Alternatively, the slot may be wider near the ends of the seal to address such uneven seal contraction.

Figure 11:
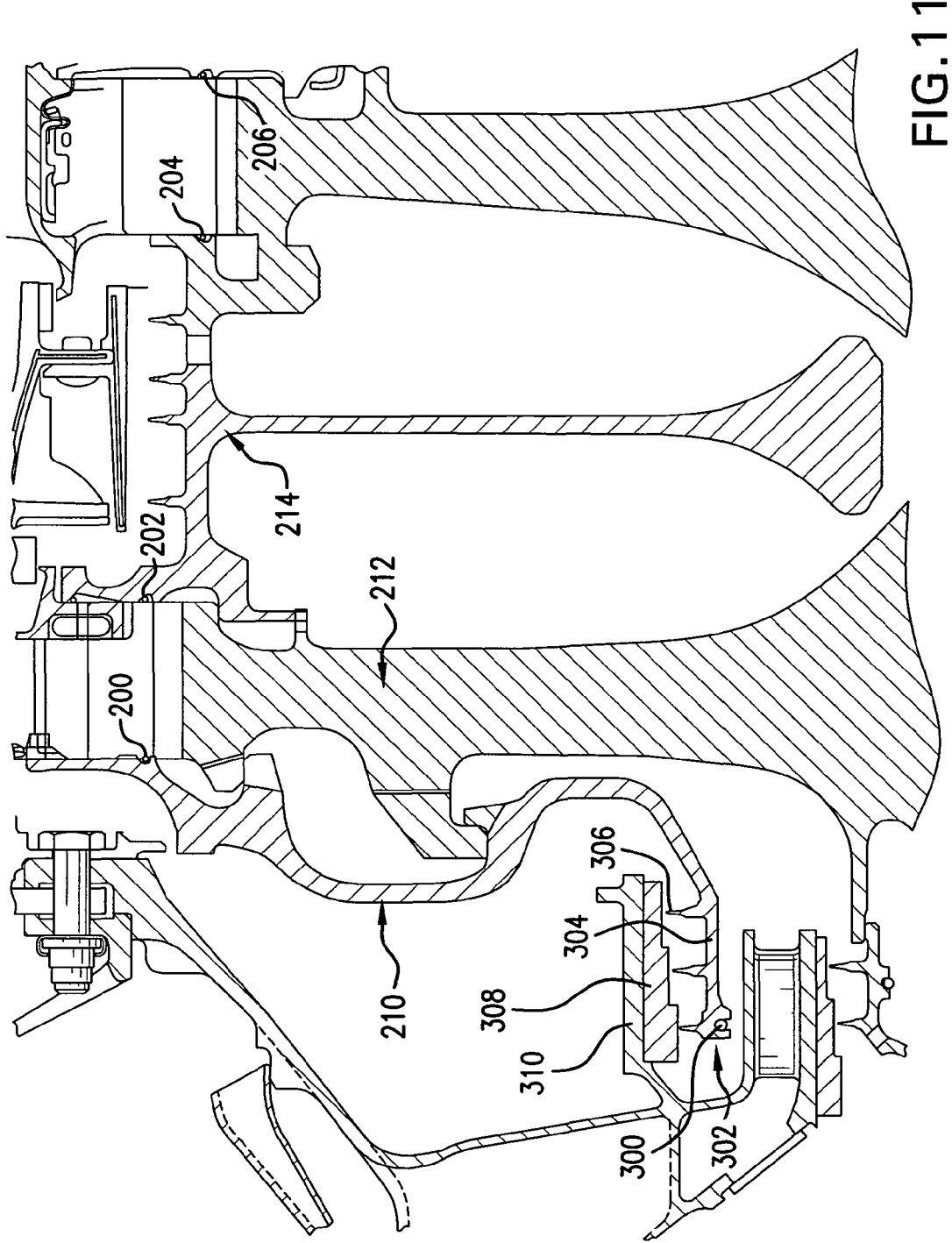
FIG. 11 is a partial longitudinal sectional view of a gas turbine engine.

Some sealing applications may involve utilizing the negative or positive Poisson's ratio to cause or increase sealing engagement. The sealing engagement may result from loading on the seal. A first group of examples involve so-called wire seals. FIG. 11 shows wire seals 200, 202, 204, and 206 at various locations on a turbine engine rotor. The exemplary seal 200 seals an aft surface of an outboard portion of a cover plate 210 to a forward surface of peripheral portion of a disk 212. The exemplary seal 202 seals an aft surface of the peripheral portion of the disk 212 to a forward surface of spacer 214.

Figure 12:
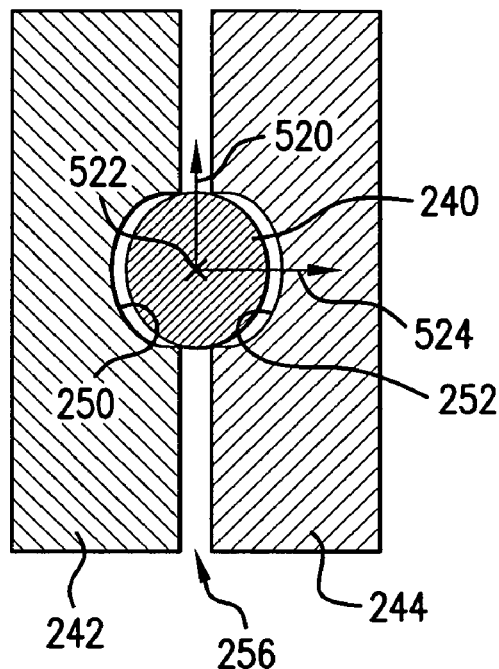
FIG. 12 is a partially schematic sectional view of a seal of the engine of FIG. 11 in a relaxed condition.

FIG. 12 schematically shows such a wire seal 240 and the two adjacent members 242 and 244 being sealed. The seal may be partially captured within one or both of recesses 250 and 252 in the members. The seal 240 may span a gap 256 between adjacent faces of the members. FIG. 12 further shows a local radial (relative to the engine rotational axis/centerline) direction 520, a local circumferential direction 522, and a local aftward/downstream direction 524. Exemplary directions 520, 522, and 524 are <0,0,1>, <1,1,0>, and <−1,1,0>, respectively.

Because the radial and circumferential directions change along the circumference of the seal 240 (200, 202, 204, and 208), the seal 240 may not be made as an ideal single crystal alloy. The crystallographic axis orientations may be achieved in one or more of several ways. The seal could be assembled from a number of short single crystal segments (e.g., welded end-to-end and/or mechanically interlocked). In such an assembly, along the length of each segment, the alignment of crystalline axes relative to physical axes is sufficiently close to provide desired performance. Alternatively, the seal could be made from a single crystal wire bent around, tolerating some elastic strain. Alternatively, the seal may be polycrystalline with low angle boundaries, wherein, within each of the crystals, the crystallographic and physical axes are sufficiently aligned. Such polycrystalline or "textured" material may be obtained in a variety of ways, such as by using special directional solidification casting techniques using a furnace moving along the circumference.

Figure 13:
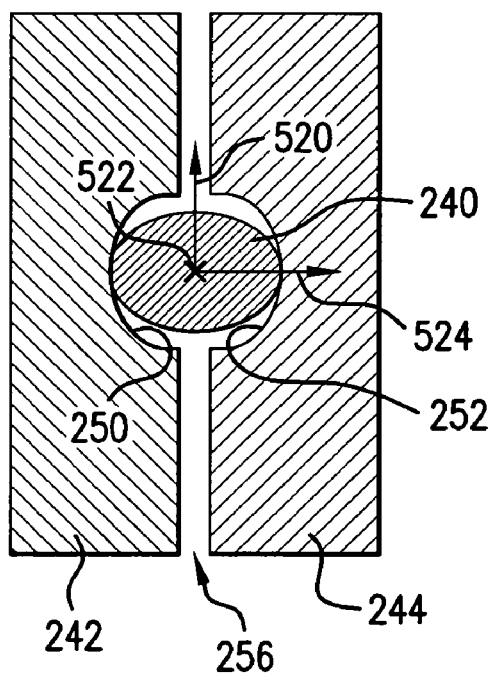
FIG. 13 is a partially schematic sectional view of the seal of FIG. 12 in an expanded condition.

When the engine is running, the members 242 and 244 will rotate together along with the seal 240 about the centerline. The rotation produces a hoop stress (tension along the circumferential direction 522). With proper crystalline orientation, this tension may produce an expansion in the direction 524 (FIG. 13) biasing the seal into improved sealing engagement with the members 242 and 244.

Other applications involve using the auxetic materials as dampers. FIG. 11 also shows a damper member 300 at an inboard end 302 of the cover plate 210. The exemplary inboard end 302 is at an inboard/forward end of a sleeve-like portion 304 bearing a plurality of annular sealing teeth (also known as lands or runners) 306 extending radially outward. The teeth 306 interface with an abradable seal material 308 held by an associated portion 310 of the engine static structure. A variety of such seal constructions and materials are known or may be developed. Exemplary material 308 may be an abradable honeycomb material. Exemplary seal and teeth configuration may provide a stepped labyrinth seal profile to reduce leakage flow.

Figure 14:
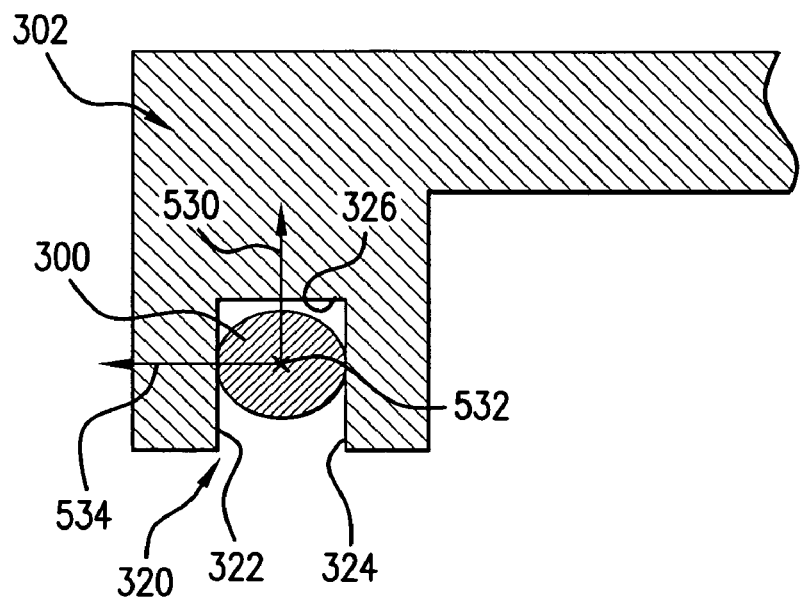
FIG. 14 is a partially schematic longitudinal sectional view of a damper of the engine of FIG. 11.
Figure 15:
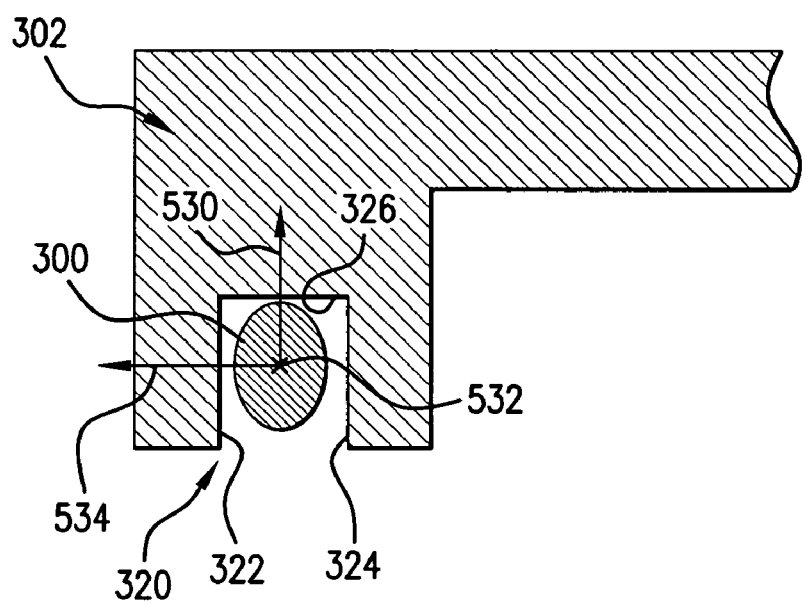
FIG. 15 is a partially schematic longitudinal sectional view of the damper of FIG. 11 in a disengaged condition.

The portion 304 may be subject to vibratory displacement as the engine runs. The damper may help damp such displacements. FIG. 14 shows the damper 300 in an initial condition wherein the engine is non-rotating. The damper 300 may be captured within a radially inwardly open slot 320 in the end portion 302. The slot 320 may have fore and aft surfaces 322 and 324 and a radially outboard base surface 326. Radial, circumferential, and longitudinal directions are shown as 530, 532, and 534, respectively. In the exemplary implementation, these may be <−1,1,0>, <1,1,0>, and <0,0,1>, respectively. The damper 300 may be constructed in a similar fashion to the wire seals described above. However, the exemplary damper may have a different crystallographic orientation. The exemplary crystallographic orientation of the damper 300 provides a longitudinal contraction (FIG. 15) responsive to the rotation-induced hoop stress. The contraction may at least partially release engagement between the surfaces 322 and 324. The release permits free or sliding radial displacements of the damper relative to the end portion 302, thereby permitting vibratory damping.

Other applications involve transfer of movement. One example is a self-cleaning filter wherein the transferred movement may be used to break-up and/or dislodge clogging deposits. FIG. 16 shows a filter element 350. The exemplary element includes a first arrayed group of members 352 and a second arrayed group of members 354. The members of each group may be parallel to each other. The groups may be oriented perpendicular or otherwise transverse to each other. The exemplary groups are overlaid. Alternatives involve intermeshing, interweaving, or even integrating. The exemplary members 352 may be formed of auxetic alloys as noted above. The members have a longitudinal direction 540, a direction 542 along the array, and a direction 544 normal thereto. The exemplary directions 540, 542, 544, respectively, correspond to the <1,1,0>, <0,0,1>, and <−1,1,0> crystallographic directions. The exemplary members 352 may be formed as square sectioned rods. Other configurations may alternatively be used. The exemplary rods 352 have a thickness T in the direction 542 and a height H in the direction 544. Gaps 356 between the rods 352 have a width W. If a tension is applied to the rods 352 along the direction 540 (FIG. 17) the rods will greatly contract in the direction 542 thereby increasing the gap width W. Additionally, the rods will expand in the direction 544 thereby increasing the rod height H. This combination of dimensional changes may be effective to break-up deposits. Depending upon the particular deposits and the particular construction, the break-up of deposits may be particularly appropriate for one or the other of back-flush or through-flush cleaning. Particulate deposit caught between adjacent rods due to irregular shape can be dislodged as the gap width is increased. Alternatively, compression rather than tension may be utilized to dislodge deposits. Additionally, the effects may be used to dynamically vary the pore size of the filter to achieve a specific particle size distribution.

Figure 18:
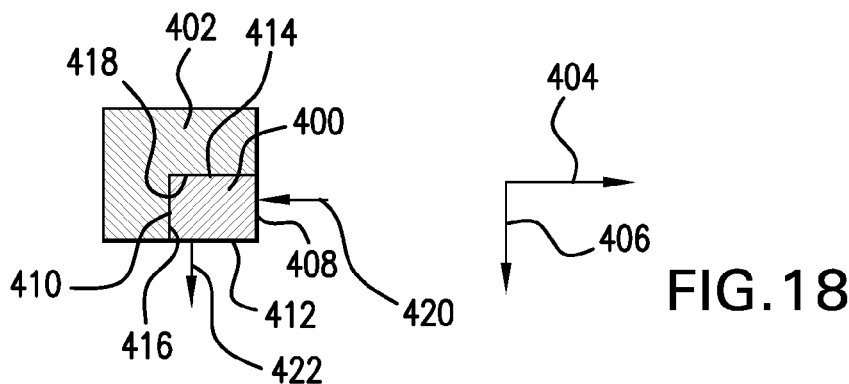
FIG. 18 is a schematic view of an out-of-phase orthogonal vibration transfer apparatus.

Another potential application is to provide high efficiency transition of mechanical movement or vibration to an orthogonal direction. Such a transmission can be very useful in applications involving piezoelectric transducers or sensors. In this case, depending on the choice of orientation, not only can the high frequency pulse be transmitted normal to its incident direction, but a phase change can also be achieved. For example if the pulse is tensile (positive strain), then the transverse side with high positive Poisson's ratio will translate the pulse into a compressive (negative strain) and the opposite will occur for a transverse side with negative Poisson's ratio. With the judicious choice of single crystal orientation, vibrations can be transmitted 90° to the original direction, and out of phase vibration can also be created. For example, FIG. 18 shows an FCC insert 400 in a rigid body 402. A <1,1,0> direction is shown as 404 and a <0,0,1> direction is shown as 406 for the insert 400. The exemplary insert is formed as a right parallelepiped having exposed face 408 facing in the direction 404. A second face 410 is opposite the face 408. Another exposed face 412 faces the direction 406 and has an opposite face 414. The faces 410 and 414 are respectively contacted by faces 416 and 418 of a recess in the body 402 accommodating the insert 400. In an exemplary implementation, at least one of the ends of the insert (i.e., above and below the plane of the drawing) are free (unconstrained) by the body.

Figure 19:
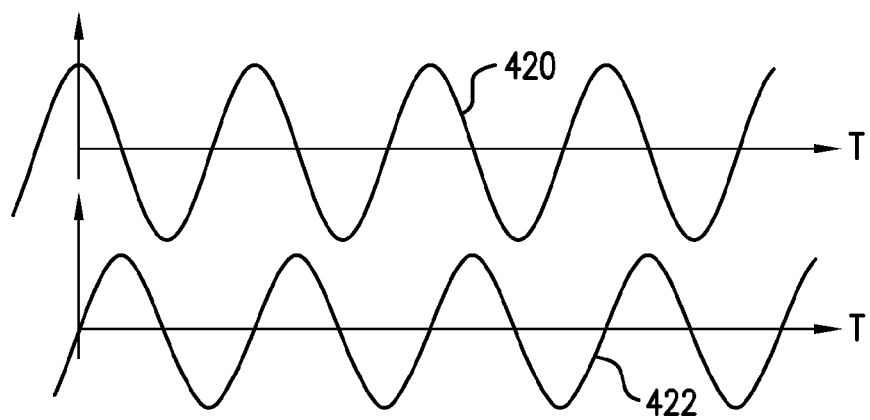
FIG. 19 is a vibration magnitude versus time plot for the apparatus of FIG. 18.

An incident pulse waveform 420 (FIG. 19) is shown encountering the face 408. An outputted pulse waveform 422 is shown leaving the face 412. In this example, because the strain pulse enters in the <1,1,0> direction but comes out along the <0,0,1> direction, the large positive Poisson's effect creates an out-of-phase strain signal. Attenuation is low, so that exemplary amplitude of the pulse 422 typically greater than 50% of the amplitude of pulse 420, such as about 70%.

Figure 20:
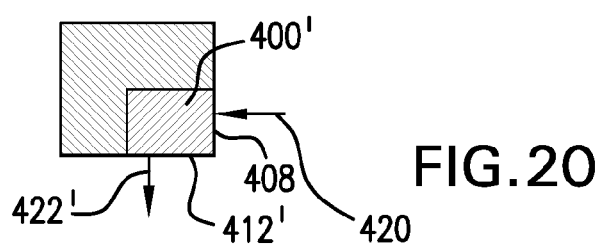
FIG. 20 is a schematic view of an in-phase orthogonal vibration transfer apparatus.
Figure 21:
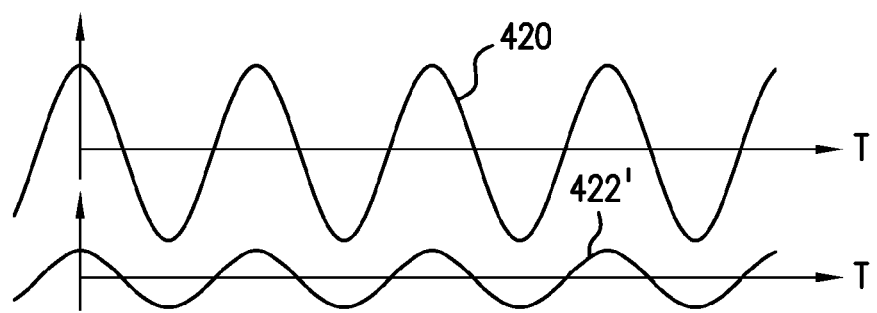
FIG. 21 is a vibration magnitude versus time plot for the apparatus of FIG. 18.

FIG. 20 shows an insert 400' receiving a similar pulse 420 on a first face 408. The crystal orientation of the insert 400', however, is such that the other exposed face 412' faces a <-1,1,0> direction. In this example, because the pulse 422' comes out of the <-1,1,0> direction, the negative Poisson's effect creates an in-phase strain signal (FIG. 21). Attenuation is great, so that exemplary amplitude of the pulse 422' is typically less than 50% of the amplitude of pulse 420 (e.g., 20% or less, such as about 12%).

There are many situations in which vibration is advantageously transmitted to or from a hostile environment (e.g., a high temperature and/or chemically hostile location). For example, much existing sensor and transducer technology can't be used in high temperature environments. Therefore, it is advantageous to transmit the vibration between the high temperature environment and a remotely located sensor or transducer.

Some transmission examples involve real-time inspection (e.g., inspecting gas turbine engine components while the engine is operating). In an exemplary situation, a transducer sends a vibration to a component. A sensor receives a return or transmitted vibration to facilitate analysis of component condition.

Another example involves vibration cancellation. A component is subject to operational vibration. A sensor receives vibration from the component. Responsive to the sensed vibration, a transducer sends a vibration to the component to at least partially cancel the operational vibration.

In such situations, appropriately oriented single crystal rods of nickel and iron based alloys with ceramic sleeves or thermal barrier coatings may be used to transmit vibration to/from the subject component. for example, such a rod could be positioned to transmit vibration between the component and the associated face of the fcc insert (e.g., of FIGS. 18 and 20). The sensor or transducer could be mounted to the other face either directly or via another intervening member.

Figure 22:
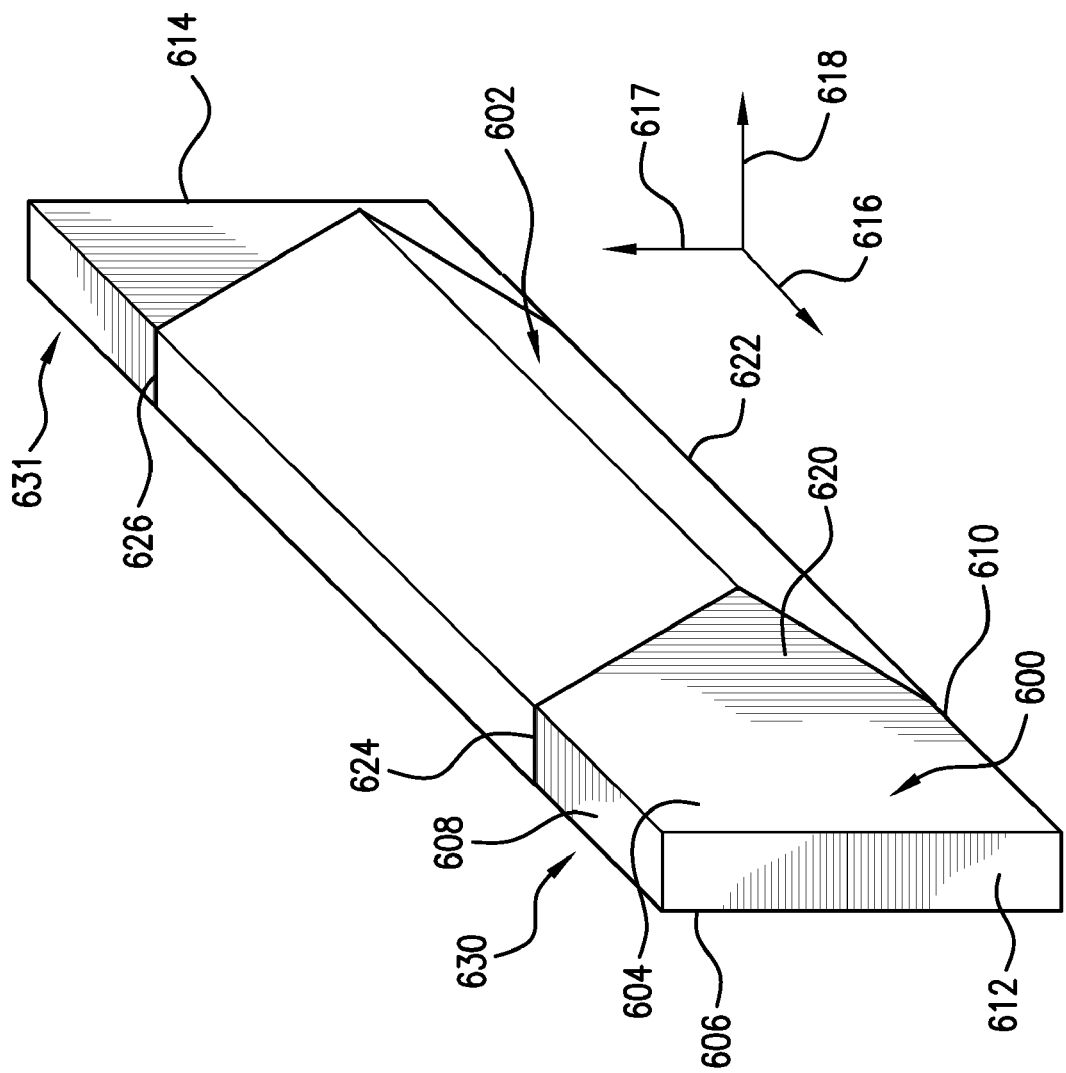
FIG. 22 is a view of a Poisson's effect augmentation assembly.
Figure 24:
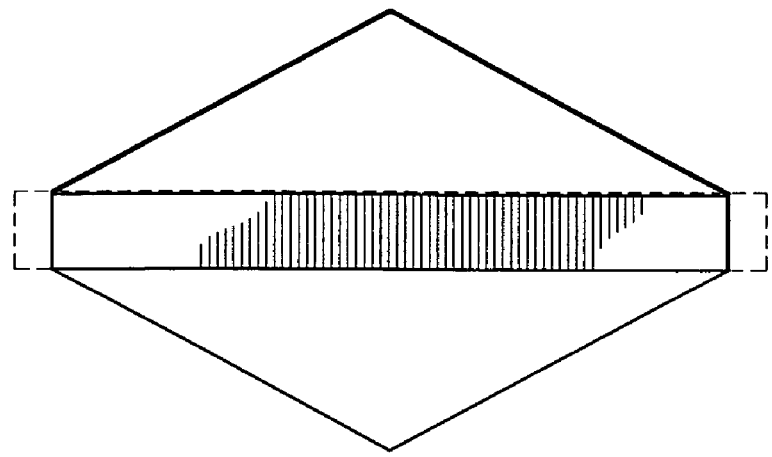
FIG. 24 is an end view of the assembly of FIG. 22 in a strained condition.
Figure 23:
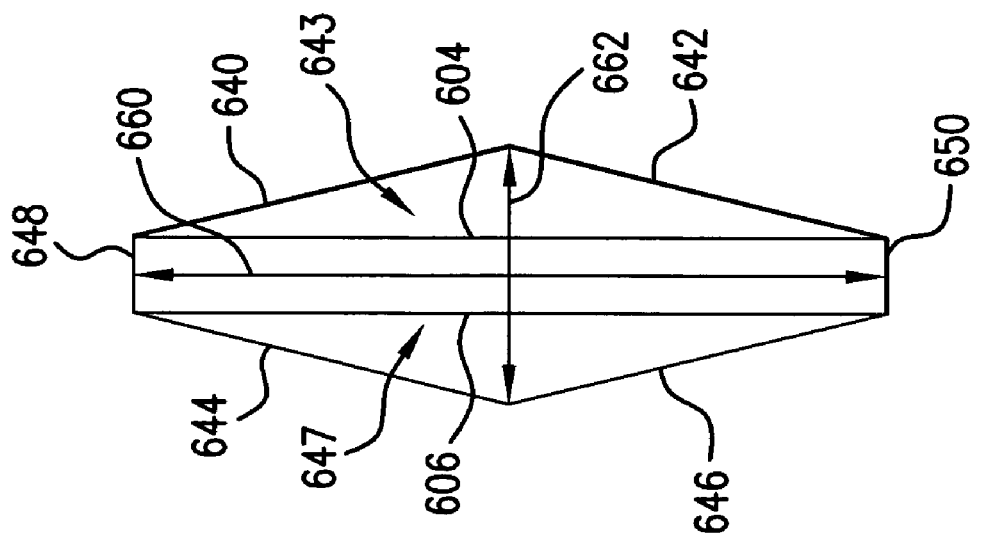
FIG. 23 is an end view of the assembly of FIG. 22 in a relaxed condition.
Figure 26:
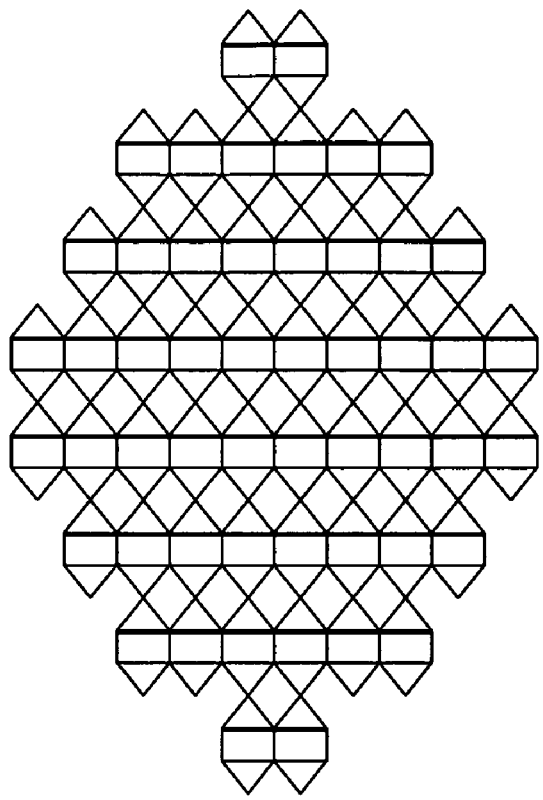
FIG. 26 is an end view of the assembly of FIG. 25 in a strained condition.
Figure 25:
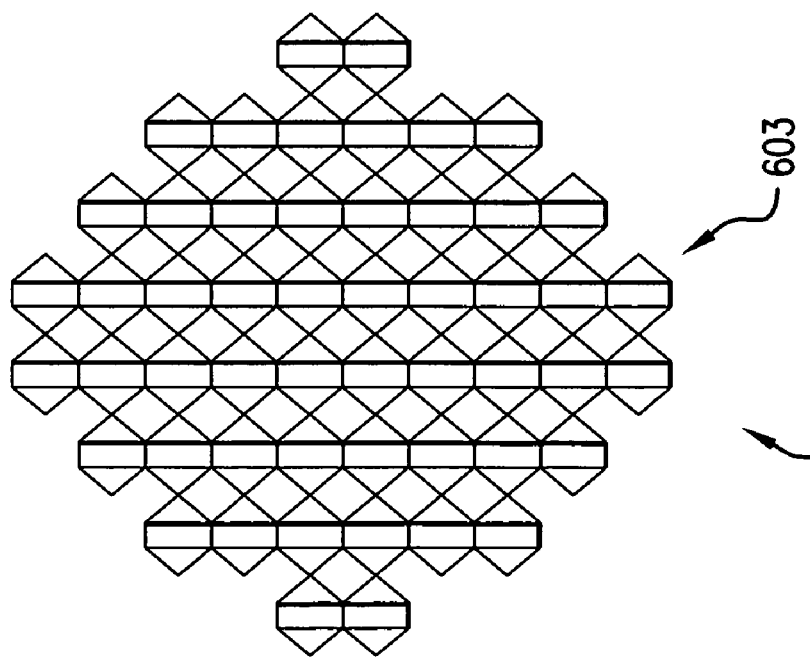
FIG. 25 is an assembly of a plurality of assemblies of FIG. 22 in a relaxed condition.

One disadvantage of using solid single crystal material is that the absolute magnitude of Poisson's displacement can be small, requiring high precision for the exemplary applications. However, it is possible to augment the displacement by combining the single crystal component with a structure that magnifies or otherwise leverages the Poisson's displacement. FIG. 22 shows one example of such an assembly. The assembly 603 has a rigid single crystal bar 600 laterally enveloped by a hexagonal-sectioned sheetmetal sleeve/jacket 602 along a portion of the bar's length. The sleeve/jacket can be a different material bonded to the single crystal bar along the edge faces 608 and 610. Alternatively, the sleeve/jacket can be an integral part of the single crystal body (e.g., unitarily cat and/or machined therewith). The exemplary bar 600 is a right parallelepiped. In the example, the longest dimension is through the sleeve and the parallelepiped has first and second principal faces 604 and 606, first and second edge faces 608 and 610, and first and second end faces 612 and 614. FIG. 22 shows a lengthwise direction 616, a heightwise direction 617 and a widthwise direction 618. In the exemplary implementation, these directions are respectively <1,1,0>, <0,0,1>, and <-1,1,0>. The sleeve 602 has interior and exterior surfaces 620 and 622 and first and second ends 624 and 626. Portions 630 and 632 of the bar protrude beyond the ends 624 and 626, respectively. FIG. 23 is an end view of the assembly in a relaxed state. The sleeve is shown having sections (sides of the hexagon) 640 and 642 adjacent the bar side 640 and cooperating therewith to define a cavity 643. Similarly, sections 644 and 646 cooperate with the face 606 to define a cavity 647. Sections 648 and 650 lie along the edges 608 and 610. The bar may be put under longitudinal tension (e.g., by pulling on the end portions 630 and 632). FIG. 24 shows the tensioned bar if a large positive Poisson's strain is realized. If the ratio of the height 660 to the width 662 of the sleeve is ten, then the Poisson's displacement along the direction 617 is approximately augmented by ten times in the direction 618. Such an assembly could be used in place of any of the examples cited above. A number of such assemblies may be combined. FIG. 25 shows a relaxed condition of an assembly 670 comprising a plurality of subassemblies 603. FIG. 26 shows the assembly 670 in a strained condition. The exemplary transverse dimensions of the individual assembly 603 are fairly small (e.g., 0.1-3.0 mm relaxed width or height). The transverse dimensions of the assemblies 670 may be much larger (e.g., 210 mm or more). For example, for various applications, the assembly 670 may be formed as near-round rods of effective relaxed diameter 0.2-2.5 mm.

One or more embodiments of the present invention have been described. Nevertheless, it will be understood that various modifications may be made without departing from the spirit and scope of the invention. For example, other applications include fasteners and use in non-turbomachine environments. Accordingly, other embodiments are within the scope of the following claims.

What is claimed is:

1. An apparatus comprising:
   a first member having a first slot extending in a first direction;
   a second member; and
   a metallic seal partially within the first slot and protruding from the first slot in a second direction to engage the second member,
   wherein:
     the seal has a crystalline microstructure oriented so that compression in the second direction causes contraction in a third direction essentially normal to the first and second directions;
     the first slot has a shoulder;
     the shoulder is formed along a convergence in the first slot; and
     the seal has a lip engaging the shoulder.

2. The apparatus of claim 1 wherein:
   the seal comprises a single crystal FCC substrate; and
   a microstructure characterized by <1,1,0> direction essentially parallel to said second direction.

3. The apparatus of claim 1 wherein:
   the first and second members are respective first and second blade platforms on a gas turbine engine.

4. The apparatus of claim 1 wherein:
   the first and second members are essentially non-rotating relative to each other.

5. The apparatus of claim 1 wherein:
   the second member has a second slot extending in the first direction; and
   the seal is partially within the second slot.

6. The apparatus of claim 5 wherein:
   the second slot has a second shoulder;
   the seal has a second lip engaging the second shoulder; and
   the second shoulder is formed along a convergence in the second slot.

7. The apparatus of claim 1 wherein the seal comprises:
   a web having opposed parallel first and second sides;
   a first protuberance along a first edge of the web; and
   a microstructure characterized by:
     a <1,1,0> direction essentially normal to the first edge and essentially parallel to the first and second sides.

8. The apparatus of claim 7 wherein the microstructure is of a nickel-based superalloy.

9. The apparatus of claim 7 wherein the first protuberance has first and second portions protruding from the first and second sides, respectively.

10. The apparatus of claim 9 wherein:
    the first and second protrusions respectively engage shoulder portions of the first slot.

11. The apparatus of claim 7 further comprising:
    a second protuberance along a second edge, opposite the first edge.

12. The apparatus of claim 7 wherein:
    the first protuberance engages shoulder portions of the first slot.

13. The apparatus of claim 7 wherein:
    the first protuberance is received in a recess in the first slot.

14. The apparatus of claim 1 wherein:
    the shoulder is a first shoulder and the lip is a first lip;
    the first slot has a second shoulder opposite the first shoulder; and
    the seal has a second lip opposite the first lip and engaging the second shoulder.

15. The apparatus of claim 14 wherein:
    the second member has a second slot extending in the first direction;
    the seal is partially within the second slot;
    the second slot has a third shoulder and a fourth shoulder opposite the third shoulder; and
    the seal has a third lip and a fourth lip opposite the third lip, the third and fourth lips respectively engaging the third and fourth shoulders.

* * * * *